United States Patent Office 2,719,864
Patented Oct. 4, 1955

2,719,864
HALOGENATED AROMATIC HYDROPEROXIDES

Joshua C. Conner, Jr., Wilmington, Del., assignor to Hercules Powder Company, Wilmington, Del., a corporation of Delaware No Drawing. Application March 17, 1950,
Serial No. 150,341

19 Claims. (Cl. 260—610)

This invention relates to a new class of organic hydroperoxides and more particularly to that class of hydroperoxides which may be defined as containing the hydroperoxy group attached to a carbon atom which is adjacent to an aromatic ring containing halogen substituents. The invention also concerns the process for producing such hydroperoxides.

There are numerous hydroperoxides known to the art, and some of these contain halogen substituents. Those containing halogen substituents, however, are derived from aliphatic hydrocarbons. Illustrative of such a halogen-containing hydroperoxide is chloro-t-butyl hydroperoxide. The prior art hydroperoxides containing halogen have not found great utility, for example, as catalysts in the polymerization of unsaturated organic compounds. They have been unsatisfactory for such use.

Now in accordance with this invention there has been discovered a class of halogenated hydroperoxides which has great commercial utility. They are extremely useful as polymerization catalysts and also may be utilized in the preparation of halogenated phenols. This class of halogenated hydroperoxides may be represented by the structural formula

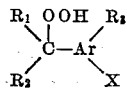

where $R_1$ and $R_3$ are members of the group consisting of H and alkyl, $R_2$ is alkyl, Ar is an aromatic hydrocarbon nucleus, and X is halogen. X may be either fluorine, chlorine, bromine, or iodine. The formula embraces those hydroperoxides which may be named as α-alkylhaloarylmethyl hydroperoxides and α,α-dialkylhaloarylmethyl hydroperoxides.

The above halogenated aromatic organic hydroperoxides may be prepared by passing an oxygen-containing gas under non-catalytic conditions through the corresponding halogenated hydrocarbon in liquid phase. For example, p-chlorocumene may be used as a starting material and oxygen may be passed through this compound in the liquid phase at a temperature of, for example, between about 20° C. and about 95° C. in the presence of an aqueous solution of a water-soluble alkali. Vigorous agitation may be utilized during the oxidation, and the reaction may be carried out until standard analytical data, such as refractive index, indicate substantial conversion of the p-chlorocumene to the corresponding hydroperoxide. Utilizing known techniques, the reaction mixture then may be worked up to recover a reaction product containing substantial and preponderant amounts of α,α-dimethyl-p-chlorobenzyl hydroperoxide.

The following examples constitute specific illustrations of the products and process of this invention. All parts are parts by weight.

Example 1

Into a glass reaction vessel equipped with a high-speed stirrer, a reflux condenser, and an oxygen inlet tube were charged 100 parts of p-chlorocumene ($n_D^{20}$=1.5135; per cent Cl=22.5), 3.1 parts of an α,α-dimethylbenzyl hydroperoxide product containing 97.6% of the hydroperoxide, and 200 parts of 0.5% aqueous sodium hydroxide solution. The reaction mixture was heated to 90° C. and oxygen was passed through the mixture at a rate of 1000 cc./min./kg. of p-chlorocumene. During the oxidation samples were withdrawn at regular intervals for determination of hydroperoxide content, the determination being carried out by adding the sample to an acidified potassium iodide solution and noting the amount of iodine liberated. The log of the run is as follows:

| Time, hrs. | $n_D^{20}$ | Percent α,α-Dimethyl-p-Chlorobenzyl Hydroperoxide |
|---|---|---|
| 3.95 | 1.5145 | 14.1 |
| 20.73 | 1.5174 | 17.3 |
| 27.73 | 1.5195 | 22.4 |
| 44.73 | 1.5225 | 34.7 |
| 50.17 | 1.5233 | 37.0 |

Upon completion of the oxidation there was recovered 74 parts of a clear, colorless product containing α,α-dimethyl-p-chlorobenzyl hydroperoxide as the principal oxygenated material. Material recovery from the oxidation, including samples withdrawn for analysis, was 98%.

Example 2

The procedure of Example 1 was duplicated with the exception that there was used 100 parts of a chloro-p-cymene ($n_D^{20}$=1.5159; per cent Cl=21.5) which was composed of a mixture of 2-chloro-1-methyl-4-isopropylbenzene and 3-chloro-1-methyl-4-isopropylbenzene. The log of the run is as follows:

| Time, hrs. | $n_D^{20}$ | Percent Chloro-p-Cymene Hydroperoxide |
|---|---|---|
| 17.83 |  | 15.4 |
| 25.33 | 1.5205 | 18.6 |
| 41.75 | 1.5222 | 25.8 |
| 43.42 | 1.5239 | 27.9 |

Upon completion of the oxidation there was recovered 71.1 parts of a clear, colorless, liquid product containing α,α-dimethyl-3-chloro-4-methylbenzyl and α,α-dimethyl-2-chloro-4-methylbenzyl hydroperoxides as the principal oxygenated materials. Based on the amount of oxygenated material, the hydroperoxides constituted 84.4% of the total. Material recovery, including samples withdrawn for analysis, was 96%.

Example 3

Using the general procedure of Example 1, oxygen was passed through a reaction mixture composed of 50 parts of 2-chloro-1,4-diisopropylbenzene, 1.51 parts of an α,α-dimethylbenzyl hydroperoxide product containing 99.2% of the hydroperoxide, and 10 parts of 0.5% aqueous sodium hydroxide. The oxidation was carried out at 90° C. and the oxygen flow rate was 500 cc./min./kg. of the chlorodiisopropylbenzene. After 50 hours of oxidation there was obtained a reaction product containing 14.9% α,α-dimethyl-3-chloro-4-isopropylbenzyl hydroperoxide. Material recovery was 96.8%.

Example 4

In this example the oxidation of p-chlorocumene was carried out under anhydrous conditions. The reaction vessel was charged with 50 parts of p-chlorocumene ($n_D^{20}$=1.5135; percent Cl=22.5), 1.51 parts of an α,α-dimethylbenzyl hydroperoxide product containing 99.2% of the hydroperoxide, and 0.5 part of calcium hydroxide. Oxygen was passed through this reaction mixture at a rate of 500 cc./min./kg. of p-chlorocumene. The temperature was maintained at 90° C. during the oxidation. The log of the run is as follows:

| Time, hrs. | $n_D^{20}$ | Percent α,α-Dimethyl-p-Chlorobenzyl Hydroperoxide |
|---|---|---|
| 1.83 | 1.5140 | 1.92 |
| 17.42 | 1.5170 | 13.3 |
| 25.33 | 1.5190 | 20.1 |
| 41.75 | 1.5220 | 29.4 |

Upon completion of the oxidation there was recovered 40.4 parts of a product containing α,α-dimethyl-p-chlorobenzyl hydroperoxide as the principal oxygenated material. Material recovery, including samples withdrawn for analysis, was 98%.

*Example 5*

The anhydrous conditions of Example 4 were used in the oxidation of 2,4-dichlorocumene. The reaction vessel was charged with 400 parts of this compound ($n_D^{20}$=1.5352; percent Cl=37.7), 9.6 parts of a p-chlorocumene oxidate containing 29.2% α,α-dimethyl-p-chlorobenzyl hydroperoxide and 4 parts of calcium hydroxide. Oxygen was passed through this reaction mixture at a rate of 250 cc./min./kg. of 2,4-dichlorocumene, and the temperature was held at 90° C. When the refractive index at 20° C. of the reaction mixture reached 1.5355, there was added 4.1 parts of an α,α-dimethylbenzyl hydroperoxide product containing 97.1% of the hydroperoxide. The oxidation was continued until the refractive index of the reaction mixture was 1.5369. There was then recovered 318 parts of a product containing 10.1% α,α-dimethyl-2,4-dichlorobenzyl hydroperoxide as the principal oxygenated material. Material recovery, including samples withdrawn for analysis, was 90%.

Although the examples have set forth the use of p-chlorocumene, 2-chloro-1-methyl-4-isopropylbenzene, 3-chloro-1-methyl-4-isopropylbenzene, 2-chloro-1,4-diisopropylbenzene and 2,4-dichlorocumene as the compounds to which oxidation was applied, other compounds having the following structural formula may be utilized

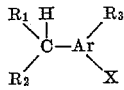

In the above formula $R_1$ and $R_3$ are members of the group consisting of H and alkyl, $R_2$ is alkyl, Ar is an aromatic hydrocarbon nucleus, and X is halogen. Essentially, all of these compounds are aromatic hydrocarbons containing one or more halogen substituents in the aromatic ring. The basic hydrocarbons corresponding to the halogenated derivatives which are oxidized in accordance with this invention therefore may be illustrated by such compounds as cumene, p-cymene, p-diisopropylbenzene, sec-butylbenzene, t-butylisopropylbenzene, p-ethylisopropylbenzene, α- or β-isopropylnapthalene, ethylbenzene, n-propylbenzene, n-butylbenzene, and n-amylbenzene. These compounds all contain either a secondary or a tertiary carbon atom adjacent to the aromatic nucleus. The aromatic nucleus need not be derived from benzene, as is the case in cumene, for example, since compounds containing aromatic nuclei, such as those derived from napthalene, anthracene, and phenanthrene, also are operable. The aromatic nucleus may be substituted with alkyl groups, as when $R_3$ is alkyl, and such compounds are illustrated by p-cymene and p-diisopropylbenzene. When $R_3$ is alkyl the groups may, for example, be methyl, ethyl, propyl, isopropyl, butyl, isobutyl, secondary butyl, tertiary butyl, and the like. When both $R_1$ and $R_2$ are alkyl they need not be limited to the methyl groups of p-cymene, cumene, and diiso-propylbenzene. Other alkyl groups, such as those previously indicated in connection with $R_3$, may be utilized, and $R_1$ and $R_2$ may be either the same or different.

The compounds which are oxidized in accordance with this invention are those hydrocarbons discussed above which contain one or more halogen substituents in the aromatic nucleus, these substituents being either the same or different. The halogen may be either fluorine, chlorine, bromine, or iodine and may occupy any of the free positions existing in the aromatic nucleus. When the aromatic nucleus is phenyl, the number of halogen substituents generally will not exceed three, and two is preferable. The same holds true for nuclei such as naphthyl, anthryl and phenanthryl, though a greater number of halogen substituents are possible in such nuclei due to the greater number of free positions. Specific compounds which may be named are p-chlorocumene, 2-chloro-1-methyl-4-isopropylbenzene, 3-chloro-1-methyl-4-isopropylbenzene, m-chlorocumene, 2,4-dichloroisopropylbenzene, 2,4,6-trichloroisopropylbenzene, 4-chloro-1-isopropylnaphthalene, p-chloroethylbenzene, 2-chloro-1,4-diisopropylbenzene, and the corresponding bromo, fluoro and iodo compounds such as p-bromocumene, p-fluorocumene, and p-iodocumene. Compounds containing different halogens may be illustrated by 2-chloro-4-bromoisopropylbenzene.

The process for producing the hydroperoxides of this invention essentially comprises passing an oxygen-containing gas under noncatalytic conditions through the halogenated aromatic hydrocarbons discussed above, the oxidation being carried out in liquid phase. The liquid phase may be either substantially homogeneous, as when anhydrous conditions are used and the compound being oxidized is the principal component of the reaction mixture, or it may heterogeneous, as when a separate aqueous phase, which may be either ordinary water or an aqueous alkaline solution, is included.

The temperature during oxidation will be in excess of 20° C. Using anhydrous conditions, the temperature range is preferably from about 50° to about 100° C., more desirably from about 65° to about 90° C. Particularly satisfactory is the range between about 75° and about 90° C. When using an aqueous phase, the temperature is preferably between about 25° and about 95° C., desirably between about 50° and about 90° C. When pressure is applied to the oxidation system, however, the temperature may be increased considerably, for example, up to about 200° C. Under anhydrous conditions using pressure the preferable range is from about 50° to about 150° C., and when using an aqueous phase and pressure, it is most desirable to operate between about 95° and about 200° C.

The pressures which can be utilized during those oxidations carried out at greater than atmospheric pressure are limited only by equipment design. From a practical standpoint, pressures from atmospheric up to about 500 p. s. i. are feasible. Pressures between about 30 and about 500 p. s. i. are advantageous, and pressures of about 50 to about 200 p. s. i. are preferable.

It is preferable that the oxidation be effected using an alkaline stabilizing agent. The examples have shown the use of sodium hydroxide and calcium hydroxide, but in general there may be used the alkali metal hydroxides, such as the hydroxides of sodium, potassium, lithium, and the like; alkaline earth metal oxides and hydroxides, such as calcium hydroxide, barium hydroxide, strontium hydroxide, calcium oxide, and barium oxide. Inorganic carbonates and bicarbonates, such as sodium carbonate and bicarbonate, and alkali metal salts of weak organic acids may also be employed. Strong organic bases such as trialkylarylammonium hydroxides, for example, trimethylbenzylammonium hydroxide, may also be used. Ammonia also is operable. These alkaline stabilizing agents may be used either in the form of an aqueous solution or as part of an anhydrous oxidation reaction mixture. When used under anhydrous conditions, the alkali preferably is in finely-divided form, and the amount may be varied from about 0.05 to about 10% by weight based on the halogen-substituted aromatic organic compound being oxidized. A preferable range on this basis is from about 1 to about 5%, and a most desirable range is from about 1 to about 3%. When used in the form of an aqueous solution, the solution will contain between about 0.01 and about 35% by weight of the alkali. Preferably, the concentration of alkali in solution will be between about 0.01 and about 2%, and a highly desirable range is from about 0.5 to about 1.0% by weight. The ratio of the quantity of aqueous alkaline solution present in the reaction mixture to the amount of compound subjected to oxidation may be varied within wide limits from about 1:50 to about 10:1. It is preferable, however, to utilize a ratio within the range of from about 1:10 to about 1:3.

Another of the preferable features of the process of this invention is the step of carrying out the oxidation in the presence of a peroxidic free radical oxidation initiator. Representative of such an initiator is an $\alpha,\alpha$-dialkylarylmethyl hydroperoxide, for example, $\alpha,\alpha$-dimethylbenzyl hydroperoxide. In general, there may be used any peroxidic substance which is capable of initiating a free radical oxidation chain under the conditions utilized. There may be used, in other words, any organic peroxide, hydroperoxide, or compound capable of decomposing to form organic free radicals. Illustrative of such materials are acetyl peroxide, benzoyl peroxide, triphenylmethyl peroxide, t-butyl hydroperoxide, tetralin hydroperoxide, and naphthene hydroperoxides. These peroxidic materials include the acyl, aroyl, dialkyl, and diaralkyl peroxides and the alkyl, aralkyl, cycloalkyl, and cycloalkenyl hydroperoxides. Other free radical initiators, such as hexaphenyl ethane, which are converted into peroxidic materials during the oxidation process of this invention also are operable. On the basis of the pure peroxidic material, the concentration of this material based on the compound being oxidized may be varied from about 0.01 to about 20%, a preferable range being from about 0.1 to about 10%. A particularly applicable amount is about 3%. When initiating the oxidation of the halogen-substituted aromatic organic compounds of this invention it may be desirable to use as the initiator the hydroperoxide obtained by oxidation of the same compound. For example, in the oxidation of p-chlorocumene it is preferable to initiate the reaction by the addition of $\alpha,\alpha$-dimethyl-p-chlorobenzyl hydroperoxide.

The examples have set forth the use of oxygen as the oxygen-containing gas, but air may be utilized, and also operable are mixtures of oxygen with nitrogen or other inert gases. The rate of input of the oxygen-containing gas should be such that at least the theoretical amount of oxygen is supplied. By theoretical amount is meant that amount of oxygen necessary to convert the halogen-substituted aromatic organic compound completely to the corresponding hydroperoxide. Actually, it is preferable to use about twice the theoretical amount of oxygen, and under such conditions the amount of oxygen in the exit gas will be about one-half of that in the input gas. The rate of input will depend upon the temperature and pressure utilized during the oxidation. Using p-chlorocumene as an example, it is possible to determine the rate of oxidation of this compound at any particular temperature and pressure and, knowing the rate of oxidation, it then is possible to calculate the amount of oxygen necessary to get the required rate. This amount of oxygen is the theoretical amount. In general, the rate of input at atmospheric pressure will be from about 1 to about 100 liters/hr./kg. of the compound being oxidized, and under pressures of, for example, 50 to 200 p. s. i., will be from about 50 to about 350 liters/hr./kg. of the compound.

The oxidation reaction mixtures of this invention are heterogeneous, consequently suitable agitation is necessary. It is important to bring the air, oxygen, or other oxygen-containing gas into intimate contact with the one or more liquid phases, and this may be effected by using high-speed stirrers, suitable nozzles, porous plates, or their combinations.

The method utilized in recovery of the reaction products will vary depending upon the use to which the hydroperoxide is to be put. If it is not necessary to separate the hydroperoxide from other components, such as alcohols, ketones, and unreacted starting material, the reaction product may be washed with dilute aqueous alkali and used either in the wet, slightly cloudy state, or after clarification and drying by filtration. If it is desired, however, to obtain a highly concentrated hydroperoxide, the crude reaction product, after the alkali wash, may be stripped of unreacted halogenated hydrocarbon by distillation at pressures of about 1 to about 10 mm. of mercury/sq. cm. Other methods which may be used to concentrate the hydroperoxides involve solvent extraction, and precipitation of the hydroperoxide with a concentrated aqueous solution (25 to 40%) of sodium hydroxide.

The process of this invention may be carried out either batchwise or continuously. It affords a means of obtaining high yields of the halogen-substituted hydroperoxides previously described. These hydroperoxides are extremely useful in polymerization processes, this being in contrast to those halogenated hydroperoxides previously known to the art. Using the halogenated hydroperoxides of this invention as catalysts in the polymerization of vinyl, vinylidene, and vinylene compounds, it is possible to obtain a given yield of polymer in less than half the time required with conventional catalysts. This holds true in polymerizations carried out not only in homogeneous systems but also in emulsion systems, and at very low temperatures, for example, below 0° C. The halogenated hyproperoxides of this invention are therefore novel and quite distinctive from any hydroperoxide previously known. They also are extremely useful in the preparation of halogen-substituted phenolic compounds. For example, p-chlorophenol may be prepared from $\alpha,\alpha$-dimethyl-p-chlorobenzyl hydroperoxide by action of a condensation catalyst such as sulfuric acid on the hydroperoxide. The reaction is one of decomposition of the hydroperoxide and results in the formation of p-chlorophenol and acetone. Due to the fact that the hydroperoxides of this invention contain their substituent groups in definite relationship to each other, it is possible through decomposition of the hydroperoxides to obtain halogenated phenols which also contain the phenolic and halogen substituents in definite relationship to each other. The novel hydroperoxides of this invention therefore afford a means of obtaining certain halogenated phenols which have in the past always been prepared in admixture with other isomers.

What I claim and desire to protect by Letters Patent is:

1. As a new product, an organic hydroperoxide having the structural formula

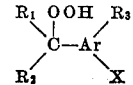

in which $R_1$ and $R_3$ are members of the group consisting of H and alkyl, $R_2$ is alkyl, Ar is an aromatic hydrocarbon nucleus, and X is halogen, the number of halogen substituents being between 1 and 3.

2. As a new product, an $\alpha,\alpha$-dialkylhaloarylmethyl hydroperoxide.

3. As a new product, an $\alpha,\alpha$-dimethylhalobenzyl hydroperoxide.

4. As a new product, an $\alpha,\alpha$-dimethyl-p-methylhalobenzyl hydroperoxide.

5. As a new product, an $\alpha,\alpha$-dimethyl-p-isopropylhalobenzyl hydroperoxide.

6. As a new product, an $\alpha,\alpha$-dimethylchlorobenzyl hydroperoxide.

7. As a new product, an α,α-dimethyl-p-methylchlorobenzyl hydroperoxide.

8. As a new product, an α,α-dimethyl-p-isopropylchlorobenzyl hydroperoxide.

9. As a new product, α,α-dimethyl-p-chlorobenzyl hydroperoxide.

10. As a new product, α,α-dimethyl-3-chloro-4-methylbenzyl hydroperoxide.

11. As a new product, α,α-dimethyl-2-chloro-4-methyl benzyl hydroperoxide.

12. As a new product, α,α-dimethyl-3-chloro-4-isopropylbenzyl hydroperoxide.

13. As a new product, α,α-dimethyl-2,4-dichlorobenzyl hydroperoxide.

14. The process of oxidizing an organic compound having the structural formula

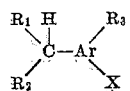

in which $R_1$ and $R_3$ are members of the group consisting of H and alkyl, $R_2$ is alkyl, Ar is an aromatic hydrocarbon nucleus, and X is halogen, the number of halogen substituents being between 1 and 3, which comprises passing an oxygen-containing gas under noncatalytic conditions through said compound in liquid phase.

15. The process of oxidizing an organic compound having the structural formula

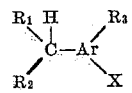

in which $R_1$ and $R_3$ are members of the group consisting of H and alkyl, $R_2$ is alkyl, Ar is an aromatic hydrocarbon nucleus, and X is halogen, the number of halogen substituents being between 1 and 3, which comprises passing an oxygen-containing gas under noncatalytic conditions through said compound in liquid phase in the presence of an alkaline stabilizing agent.

16. The process of oxidizing an organic compound having the structural formula

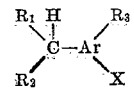

in which $R_1$ and $R_3$ are members of the group consisting of H and alkyl, $R_2$ is alkyl, Ar is an aromatic hydrocarbon nucleus, and X is halogen, the number of halogen substituents being between 1 and 3, which comprises passing an oxygen-containing gas under noncatalytic conditions through said compound in liquid phase in the presence of an aqueous alkaline solution.

17. The process of oxidizing an organic compound having the structural formula

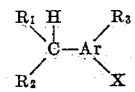

in which $R_1$ and $R_3$ are members of the group consisting of H and alkyl, $R_2$ is alkyl, Ar is an aromatic hydrocarbon nucleus, and X is halogen, the number of halogen substituents being between 1 and 3, which comprises passing an oxygen-containing gas under anhydrous, noncatalytic conditions through said compound in liquid phase in the presence of a peroxidic free radical oxidation initiator.

18. As a new product, an α-alkylhaloarylmethyl hydroperoxide, the number of halogen substituents being between 1 and 3.

19. As a new product, an α,α-dialkylhaloarylmethyl hydroperoxide, the number of halogen substituents being between 1 and 3.

References Cited in the file of this patent

UNITED STATES PATENTS

| Number | Name | Date |
|---|---|---|
| 2,447,794 | Brewer | Aug. 24, 1948 |
| 2,449,347 | Vaughn et al. | Sept. 14, 1948 |
| 2,480,971 | Rust et al. | Sept. 6, 1949 |
| 2,508,256 | Harman | May 16, 1950 |
| 2,547,938 | Hall | Apr. 10, 1951 |
| 2,548,435 | Lorand et al. | Apr. 10, 1951 |
| 2,608,570 | Harman | Aug. 26, 1952 |

FOREIGN PATENTS

| 610,293 | Great Britain | Oct. 13, 1948 |